United States Patent
Auerbach

[15] 3,648,306
[45] Mar. 14, 1972

[54] PROTECTIVE AND SUPPORT DEVICE FOR VEHICLE TRAVEL

[72] Inventor: Seymour Auerbach, 115 Hesketh Street, Chevy Chase, Md. 20015

[22] Filed: June 11, 1970

[21] Appl. No.: 45,284

[52] U.S. Cl. ........................................ 5/94, 5/118, 5/348, 297/DIG. 3, 297/385
[51] Int. Cl. ................. A47d 7/00, A47c 27/08, A47c 27/18
[58] Field of Search ................. 5/94, 98, 118, 348; 297/230, 297/231, 385, 456, DIG. 3

[56] References Cited

UNITED STATES PATENTS

| 2,648,072 | 8/1953 | De Blieux | 5/94 |
| 3,513,489 | 5/1970 | Miller et al. | 5/98 |
| 2,649,593 | 8/1953 | Kirsten | 297/232 X |
| 3,265,438 | 8/1966 | Regan et al. | 297/456 X |
| 3,381,999 | 5/1968 | Steere, Jr. | 297/453 |
| 3,420,574 | 1/1969 | Smith | 5/98 R X |
| 3,265,437 | 8/1966 | Mincieli | 297/231 X |
| 2,676,337 | 4/1954 | Soeder | 5/94 |

Primary Examiner—Casmir A. Nunberg
Attorney—Le Blanc & Shur

[57] ABSTRACT

The device includes an inflatable unit having a first portion conformable, when inflated, to overlie the seat of an automobile and a second depending portion adapted for disposition in the well between the front and back seats of the automobile or in the front seat well. The first portion provides a generally flat support surface between the front and rear seat backs. In one form, an inflatable tube is secured about the edges of the unit to fill the gap between the unit and the automobile sides and the forward walls of the wells. In another form, one or more inflatable tubes are secured along the edge of the first mentioned tube to project above the support surface, the one or more tubes defining an enclosed area about the support surface as well as providing a protective cushion between the enclosed area and the fixed interior parts of the automobile such as door and window handles and the like. The unit, in another form, is slotted to receive safety belts and, in another form, pockets are provided in the tube. In still another form, one or more inflatable seats are releasably secured to the unit. In a further form, the unit has a central opening, the unit forming a protective cushion about an individual, i.e., a child sitting on the automobile seat.

18 Claims, 14 Drawing Figures

PATENTED MAR 14 1972  3,648,306

INVENTOR
SEYMOUR AUERBACH
BY LeBlanc & Shur

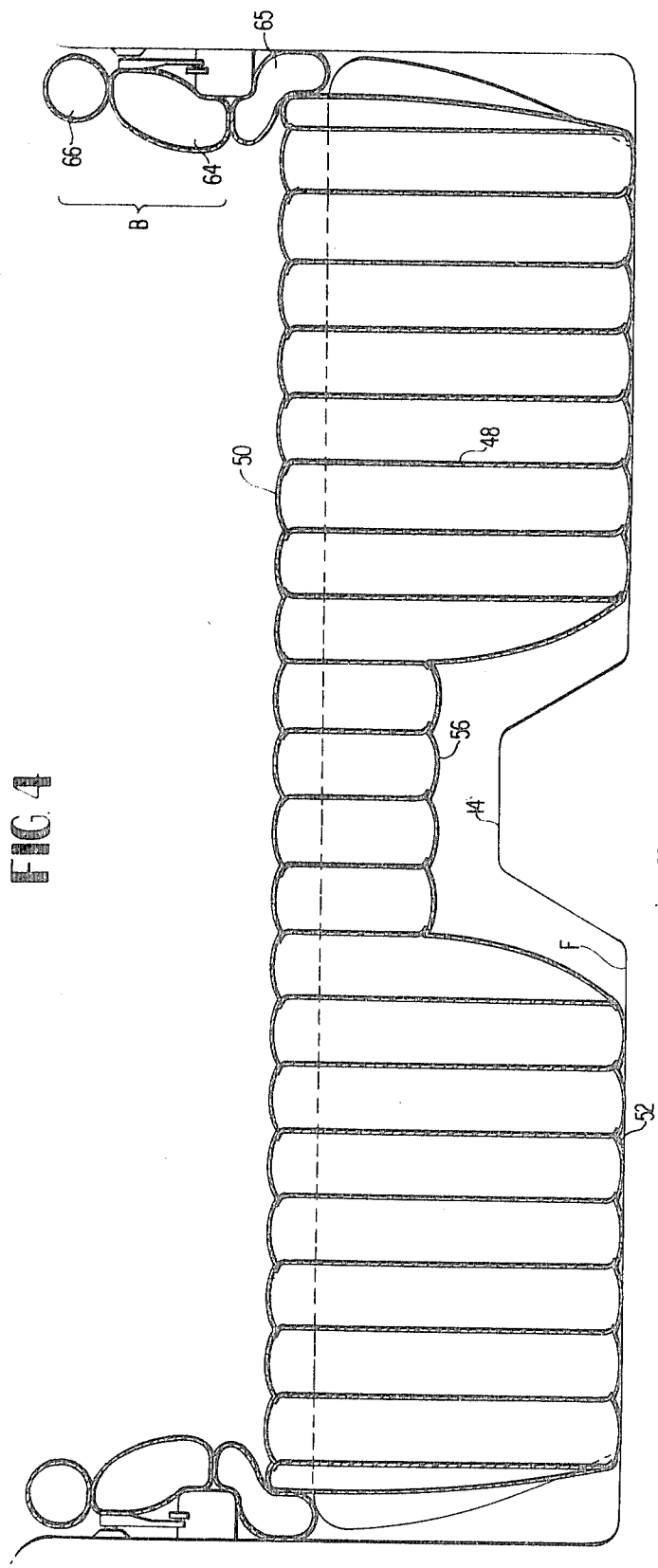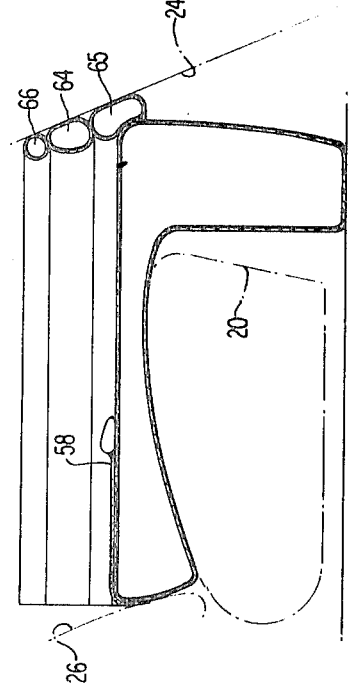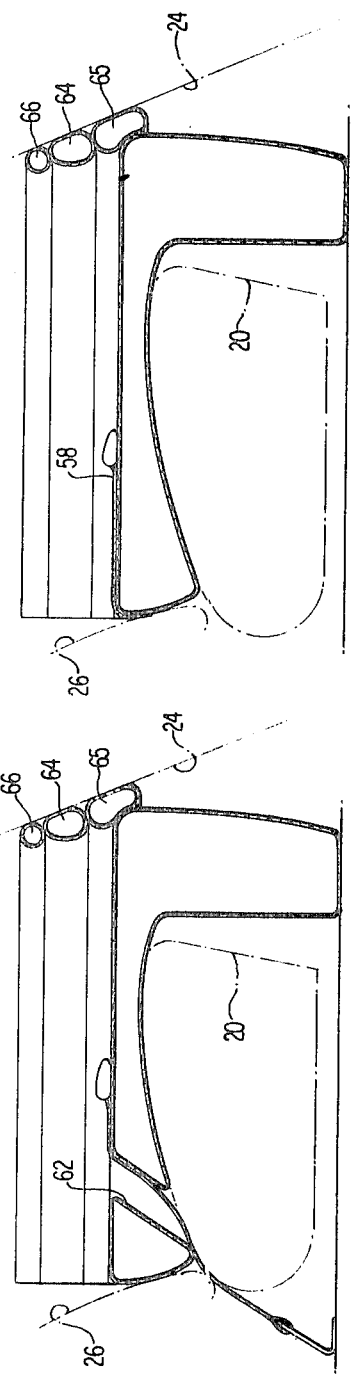

PROTECTIVE AND SUPPORT DEVICE FOR VEHICLE TRAVEL

The present invention relates to a support and protective device for vehicle travel and particularly relates to an inflatable support and protective unit for use in the cockpit of an automobile to provide a support for loads carried by the automobile, and/or a level cushioned protective support and play area for children.

The general purpose of the present invention is to convert the cockpit of an automobile from an area having a limited area of horizontal support surface, i.e., principally the automobile seat, into an area having a horizontal support surface extending, when the device hereof is utilized in the rear cockpit, the full distance between the front and rear seat backs and between opposite sides of the automobile and when utilized in the front cockpit, extending along the passengers side between the front seat back and the forward wall of the front seat well or dash.

The purpose of the present invention is also to provide a support and protective device for use in the front and rear cockpits of an automobile whereby either cockpit can be converted from an area having a large number of protuberances, rigid fixtures and the like against which an unrestrained individual, for example a child, can be thrown in the event of a sudden stop, turn, etc. with resulting injury to such individual into an enclosed area wherein restraints limiting movement of the individual need not be imposed and which area has a protective barrier or cushion against which the individual can be thrown without injury in the event of a sudden braking, impact, or the like. Moreover, the present invention is designed to permit ready and easy conversion of either of the conventionally configured front or rear cockpits of an automobile to the support and protected areas herein disclosed.

It will be appreciated, as the description of the present invention proceeds, that the inflatable unit hereof can be provided in two forms for respective use in the front and rear cockpits of automobiles, the unit provided the rear cockpit having generally twice the width of the unit provided the front cockpit (the latter unit being, of course, provided only on the passenger side of the front cockpit) with both units having like longitudinal cross-sectional configurations and being similar in all other respects except as otherwise noted. To facilitate description, the present invention is described, for the most part, in connection with its use in the rear cockpit of the automobile, it being appreciated that the invention can be equally as well utilized in the front passenger cockpit of the automobile subject to the foregoing width limitation and other limitations as hereinafter specified.

Accordingly, the present invention provides an inflatable unit having a first generally rectangular portion configured, when inflated, to overlie the rear seat in an automobile and to project forwardly over the well between the front seat back and rear seat (or to project forwardly in the front cockpit of the automobile over the well on the passenger side). The inflatable unit also includes a depending second portion for disposition in the rear well (or front well) to provide support for the front portion of the unit forwardly of the rear (front) seat. The upper face of the unit, when inflated and when the unit is disposed in the automobile, constitutes a generally horizontal cushioned surface on which a load can be supported or on which, for example, a child can lay or move about. Furthermore, the underside of the first portion of the unit which overlies the seat is configured to generally conform to the upper surface of the rear seat thereby to provide constant support over the full area of the unit overlying the rear seat. To make the device hereof compatible with the interior configuration of the rear cockpit of automobiles, the depending portion of the inflatable rear cockpit unit has a recess along its lower edge to accommodate the central hump or tunnel which extends along the floor of the automobile in the well between the front and rear seats. In the front cockpit, the lower inside corner of the depending portion of the front cockpit unit can be inset to accommodate the tunnel. It will be appreciated that the unit is thus configured, when inflated, to occupy essentially the full volume of the rear cockpit in a specified automobile below a horizontal plane just above the upper surface of the rear seat. (The front cockpit unit is configured to occupy the full volume of the passenger side of the front cockpit below a horizontal plane just above the upper surface of the front seat.) In this manner, the unit is self-sustaining in its proper position in the automobile and relative motion between it and the automobile is precluded in the event of a sudden stop, turn, impact or the like.

The device hereof can be utilized in substantially all of the wide variety of makes and models of automobiles by the employment of an inflatable element which conforms the plan area of the unit to the interior plan area of the cockpit of a specified automobile. For example, in full size six passenger automobiles, the unit can be perimetrically expanded in plan form by use of the inflatable element to the lateral dimensions of the rear cockpit. Particularly, the element is provided about the margin of the unit and can be inflated to increase the effective lateral dimensions of the unit to the desired length and width. The inflatable element also assists in maintaining the unit against movement relative to the automobile in the event of a sudden stop or the like as the effect, element, in effect, wedges the unit into the proper position within the automobile cockpit. While the device hereof is preferably manufactured in a standard size for all the various makes and models of automobiles of conventional size wherein the basic unit without the inflatable element is per se specifically compatible with a smaller standard size automobile with the inflatable element adapting the basic unit to the larger automobiles, the basic unit as well as its inflatable element adapter may be manufactured in various sizes as needed to accommodate and to be specifically useful in and compatible with per se, for example, smaller or larger than standard size passenger automobiles. The inflatable adapter may be inflatable separately from the basic unit.

Further to the present invention it will be appreciated that when children travel by automobile, it is common practice for the children to occupy the rear seat of the automobile free of restraint. While safety belts and other types of restraints are often provided in the rear seat, all to often these safety devices are not utilized and the children are free from all restraint. Obviously, a sudden braking or turning of the automobile permits motion of the children relative to the automobile and this oftentimes results in injury to the children. For example, a child can be thrown against the rigid back of the front seat as a result of a sudden stop, or against the interior protuberances on the sides of the car such as window or door handles and arm rests or the like in the event of a sharp turn, whether anticipated or not. Accordingly, it is a further feature hereof that a protective barrier is provided about the support surface of the unit to form a protected enclosure. This barrier includes one or more superposed inflatable tubes secured about the margins of the basic unit or to the inflatable element previously described. These tubes when thus secured lie between the enclosed area and the relatively rigid portions of the front seat back and the interior protuberances on the sides of the car, for example, the window or door handles, arm rests, and the like, the barrier being provided along the front and side margins of the unit with the seat back forming a portion of the barrier along the fourth side of the unit. The inflatable barrier in conjunction with the seat back thus forms a protective cushion against which an unrestrained individual could be thrown without injury in the event of a sudden stop, turn, impact or the like. Preferably, this protective barrier and the basic unit are separately inflatable, the former being releasably secured along the edges of the latter or to the inflatable element previously described to form the enclosure.

As a further safety feature hereof, the basic unit is provided with a plurality of slots for receiving conventional seat belts, or other restraining devices. Should it be desired to restrain a child from movement, the child being supported on the cushioned support member, the safety belts can be simply disposed about the child in the conventional manner. As a further embodiment, safety straps are also provided on the unit per se whereby a child's motion along the inflatable unit's support surface can be limited or fully restrained as desired. It will be appreciated that, as an additional safety precaution, conventional safety belts on the automobile seat may be employed to further secure the inflatable unit in position overlying the seat.

A further feature hereof is the provision of another form of separately inflatable tubular protective element which is either fixedly or releasably secured along the edges of the basic unit and which completely surrounds the latter in a manner to define a fully enclosed play area or crib. Also, suitable pockets and openings can be provided in this latter protective element for toys, bottles or the like as desired. In a further form of the present invention, one or more separately inflatable seats can be releasably secured along the upper surface of the basic unit whereby the child can sit in an elevated position as in a conventional child's car seat. Suitable restraining devices are provided on the seat. As will be appreciated, a single seat can be provided with the remaining area of the basic unit which extends preferably between the opposite sides of the car constituting a play area for the child. A pair of seats can be provided in side by side relation if desired. Also, the inflatable seats can be utilized per se without the basic unit simply by securing the inflatable seat to the automobile seat by the seat belts.

In a still further form of the invention, the basic unit is provided with a central opening whereby, when inflated and disposed in the automobile, the upper portion of the rear seat is fully exposed through the opening. In this form, a portion of the unit which is disposed in the well is spaced from the front edge of the rear seat. Thus, the rear seat per se, provides the seat support for an individual, the individual being fully surrounded on all sides by the protective cushion formed by the basic unit.

Accordingly, it is a primary object of the present invention to provide a support and protective device for the front or rear cockpit of an automobile.

It is another object of the present invention to provide a substantially flat area in the cockpit of an automobile on which a child can play or sleep or a load can be supported.

It is still another object of the present invention to provide a protective device for children in the cockpit of an automobile which will substantially preclude the danger of injury to the person of the child in the event of a sudden stop, turn, impact or the like.

It is still another object of the present invention to provide a protective device for the cockpit of an automobile in which the protuberances projecting within the interior of the car, for example the window and door handles as well as the rigid parts forming the front seat back or dash as applicable are fully covered with a cushioning element.

It is a still further object of the present invention to provide a support and protector device for the cockpit of an automobile in the form of a fully enclosed playpen or crib for children.

These and further objects and advantages of the present invention will become more apparent upon reference to the following specification, appended claims and drawings wherein:

FIG. 4 is an enlarged transverse cross-sectional view of another form of the support and protective device hereof;

FIG. 6 is a cross-sectional view of a form of the invention illustrated in FIG. 5;

FIG. 7 is a view similar to FIG. 6 illustrating another form of the invention hereof;

Figure 1:
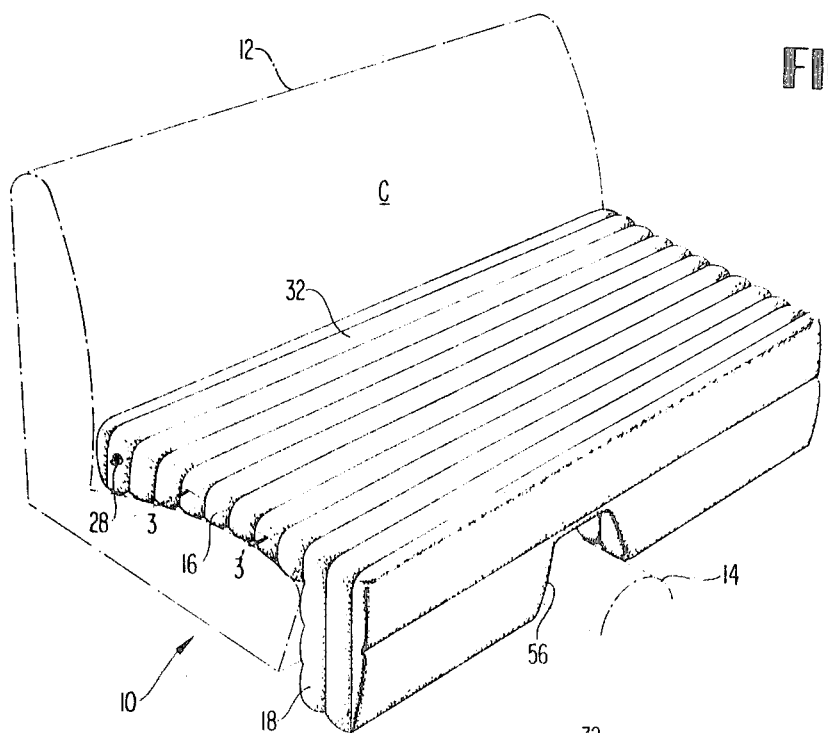
FIG. 1 is a perspective view of a support and protective device constructed in accordance with the present invention and disposed in the rear cockpit of an automobile.
Figure 2:
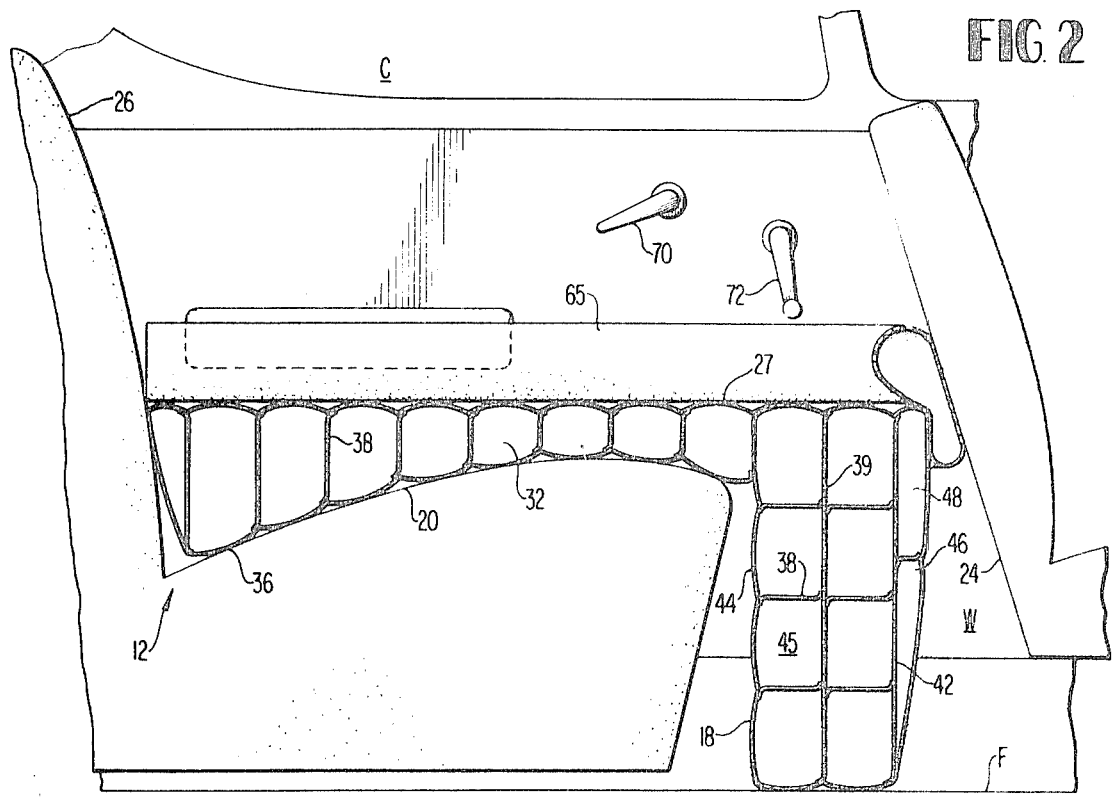
FIG. 2 is a vertical cross-sectional view of the device illustrated in FIG. 1 as disposed in the rear cockpit of an automobile and utilizing an inflatable element adapter.

Referring now to the drawings particularly to FIG. 1, there is illustrated a support and protective device constructed in accordance with the present invention generally indicated at 10 and disposed in the rear cockpit C (FIG. 2) of an automobile, the rear seat of cockpit C being indicated by the dashed lines 12 in FIG. 1. Also illustrated schematically is the tunnel 14 for housing the drive shaft which runs longitudinally along the floor and through the central portion of many types of automobiles. The device 10 comprises an inflatable unit having, when inflated and disposed in the automobile, a first horizontally extending portion 16 and a second portion 18 depending vertically from and along the forward edge of horizontal portion 16. Portion 16, as seen in FIG. 2, is specifically adapted and configured to overlie the seat portion 20 of rear seat construction 12 while the depending portion 18 is adapted to lie in the well W of the automobile between the front seat back 24 and the forward portion of rear seat 20. The lower edge of depending portion 18 preferably rests on the floor F of the automobile. The foregoing described configuration is basic to the present invention and forms the basic component from which the other embodiments hereof are derived as hereinafter described. As illustrated in FIG. 2, the underside of portion 16 is preferably specifically configured to conform to the contour of the upper face of seat 20 while its rear edge is adapted to butt the forward face of rear seat back 26. Accordingly, with the lower edge of depending portion 18 resting on floor F and the lower face of portion 16 following the contour of rear seat 20, the upper flat surface 27 of device 10 is provided support at each point therealong and will remain in a substantially horizontal configuration. It will also be appreciated that, when device 10 is fully inflated, it preferably extends to the opposite sides of the car and between the front and rear seat backs 24 and 26 respectively to provide a substantially horizontal surface throughout the entirety of the rear cockpit area including well W. With this basic inflatable unit disposed in the rear seat, there is thus provided a supporting surface which is substantially larger in area than the area of the rear seat 20 per se and a surface which is horizontal in contradistinction to the contoured seat surface. Thus, surface 27 constitutes an enlarged support surface for loads which can thus be disposed and maintained in a horizontal position. Also, by utilizing this basic configuration, there is also provided a large area for one or more children, the basic unit fully supporting the childrens weight through its entire area. There is no danger that the children can fall into well W, as would otherwise be the case, since device 10 substantially covers and fills well W and extends from the front to the rear seat backs.

Figure 8:
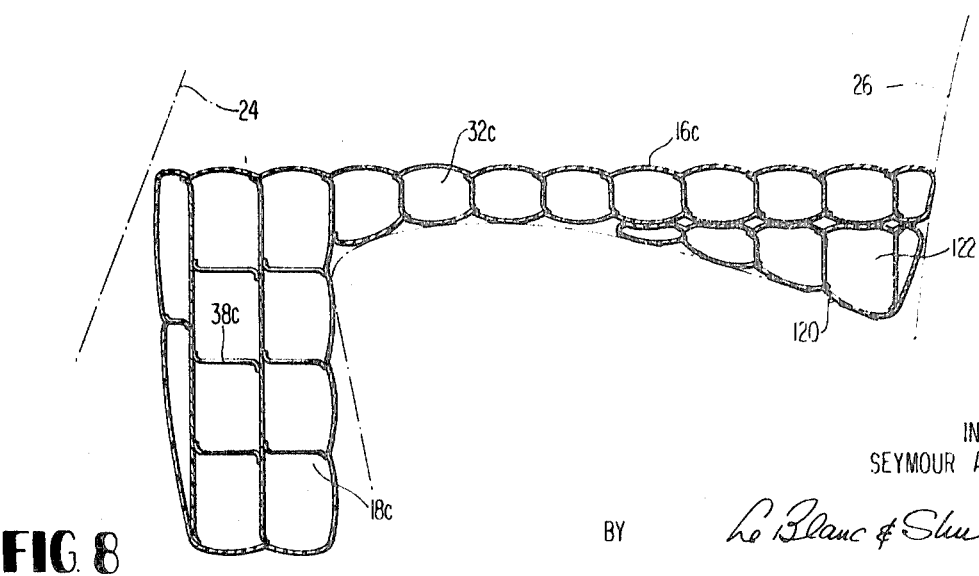
FIG. 8 is a vertical cross-sectional view of another form of the invention hereof.

It will be appreciated that the basic unit 10 can be readily, easily and quickly installed in the rear cockpit of an automobile simply by draping the uninflated portion 16 over rear seat 20 with the uninflated portion 18 depending in well W, or by preinflating the basic unit for subsequent disposition in the automobile cockpit. Preferably, device 10 is inflated from a single valve 28, (FIG. 1) by means of a manual or automatically actuated air pump or from an aerosol container compatible with the valve 28 and dispensing air, the pump and container not being shown. Valve 28 may also be of the type to permit inflation of device 10 orally. As unit 10 is inflated, it assumes the configuration illustrated in cross section in FIG. 2, and when fully inflated, fills substantially the entire area between the opposite sides of the car and between the front and rear seat backs 24 and 26 respectively. As will be appreciated, device 10 when fully inflated, is restrained from substantial movement relative to the automobile due to its particular shape i.e., restrained from 1) forward or rearward movement by its forward and rear edges which engage front and rear seat backs 24 and 26 respectively, and by the engagement of the contoured underface of portion 16 along seat 20, 2) lateral movement by engagement of the sides of portions 16 and 18 against the sides of the automobile, and 3) upward movement by the engagement of the front edge of portion 16 and rear face of portion 18 against the front seat back 24 and forward edge of seat 20 respectively (FIG. 8). When it is desired to remove device 10 from rear cockpit C, the latter can simply be deflated by opening air valve 28. Thus, air can be readily ejected from device 10 whereupon it can be folded to form a compact package ready for storage in the automobile or in its trunk.

Device 10, including the embodiments hereof to be described, can be formed of any suitable material capable of being inflated and retaining its shape once inflated. For example, synthetic or natural rubber, rubberized plastics or plastics such as polyethylene, polypropelene, or polyvinyl chloride could be employed. Plastic or rubber impregnated fabric or nylon may be also be employed to impart strength to device 10 as well as to preclude tearing of and to provide a puncture resistant material.

Figure 3:
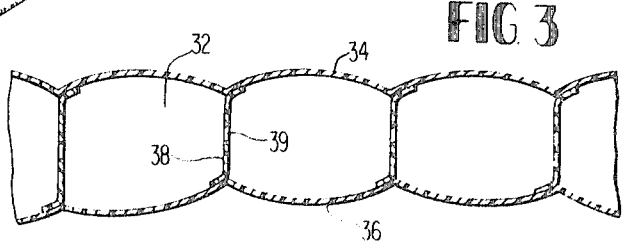
FIG. 3 is an enlarged cross-sectional view taken generally about on lines 3—3 in FIG. 1.

Any suitable form of interior construction may be provided whereby device 10 obtains and retains the desired shape, i.e., the shape generally illustrated in FIG. 2. A preferred form of the present invention provides a plurality of transversely extending elongated tubelike members 32. This can be accomplished by interconnecting a pair of spaced sheets of material 34 and 36 (FIG. 3) by a plurality of longitudinally spaced transversely extending elongated webs 38. Depending upon the type of material utilized, the opposite edges of webs 38 can be stitched, heat sealed, or otherwise secured to the opposite sheets 34 and 36 to form the elongated tubelike member 32. Webs 38 permit device 10 to obtain and retain its shape when fully inflated and are provided with one or more openings 39 whereby tubes 32 lie in communication one with the other. In this manner, only a single inlet valve is required. Obviously, device 10 could be made in separate sections separately inflatable if desired. For example, the horizontal portion 16 and depending portion 18 could be formed as separately inflatable sections if desired.

Referring to FIG. 2, it will be noted that the width of webs 38 increases, from a nominal width intermediate the length of portion 16 at the location of the highest point of rear seat 20, to a width about three times as large at the rear seat of seat 20 adjacent back 26 whereby the lower face of portion 16 is adapted to conform to and follow the contour of the upper surface of seat 20. Thus, when device 10 is inflated, a substantially horizontal upper surface is provided with full support at each point therealong. As illustrated in FIG. 2, depending portion 18 is similarly constructed. Particularly, an intermediate sheet 40 is provided and webs 38 connect between sheet 40 and forward and rear panels 42 and 44 respectively to form a plurality of elongated tubes 45. Additionally, inflatable tubular sections 46 and 48 are provided forwardly of panel 42 to extend depending portion 18 forwardly to adjacent the front seat back 24. The openings 39 through webs 38 may lie at opposite ends of the tubular members 32 or directly adjacent one another as desired. Other types of constructions can be utilized to form the basic configuration illustrated in FIG. 1. For example, instead of providing transversely extending tubular members 38 as in FIG. 1, there is provided, as illustrated in FIG. 4, longitudinally extending inflatable compartments separated by webs 48. Webs 48 are formed in the cross-sectional shape, for example at the peripheral margins of the device 10 as illustrated in FIG. 2 and their opposite edges are suitably secured between upper and lower panels 50 and 52 respectively. Openings are preferably provided in the webs whereby the compartments defined thereby lie in open communication one with the other.

It is a feature of the present invention that the depending portion 18 of device 10 is specifically configured to conform about tunnel 14. To this end, a central portion of depending portion 18 is recessed as at 56 in FIG. 1. Thus, the lower edges of portion 18 rest on floor F of the automobile on opposite sides of hump 14 while the recessed portion 56 conforms generally about tunnel 14.

Figure 5:
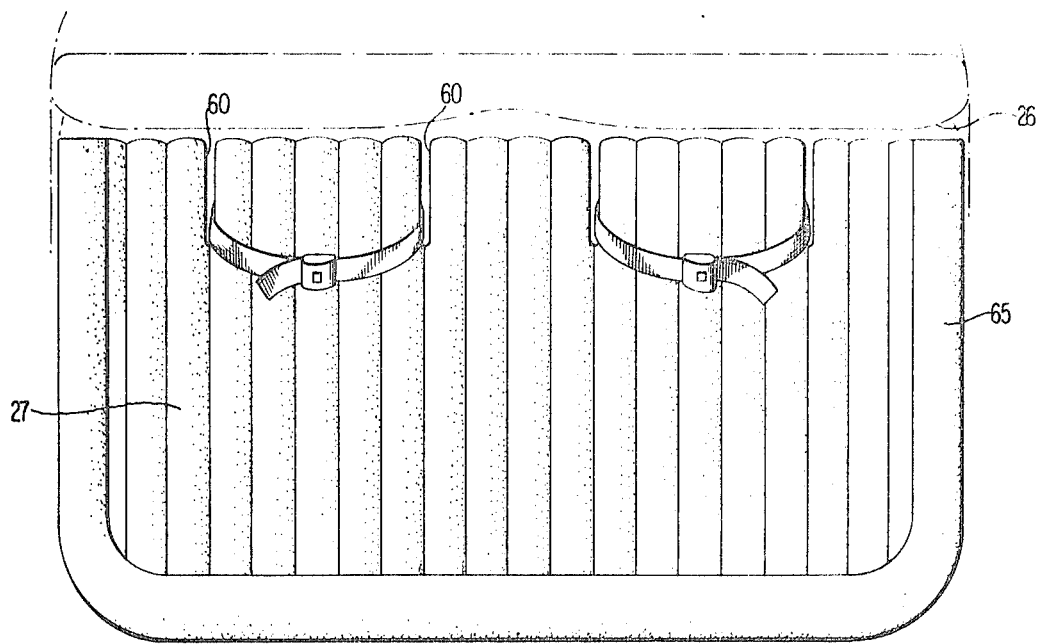
FIG. 5 is a plan view on a reduced scale of the device illustrated in FIG. 4.

Referring now to FIG. 7, because of the inflatable nature of the device 10, it is convenient for the seat belts 58 conventionally provided in the rear seat of an automobile to extend upwardly between the rear edge of portion 16 and rear seat back 26. In this manner, conventional safety belts can be conveniently employed to restrain a child in the rear cockpit as desired. To facilitate use of the safety belts, a pair of slots 60, illustrated in FIG. 5, can be provided for receiving the belt portions between the buckle and link and the safety belt anchorages. To facilitate construction, the slots are, in FIG. 5, open along the rear edge of portion 16. Further the seat belts may be employed to ensure lodgment of device 10 in the rear cockpit C. To this end, the straps of the safety belt can be inserted through the respective slots 60 with the strap buckle and link being joined to clamp the portion between slots 60 and hence unit 10 to seat 20. As illustrated in FIG. 6, slots 62 can be provided through the portion 16, the slots in this form being enclosed along the rear edges of unit 10.

The device hereof can be utilized in substantially all of the wide variety of makes and models of automobiles by the employment of an inflatable element which conforms the plan area of the unit to the interior plan area of the cockpit of a specified automobile. As previously noted, in large full size six passenger automobiles, the unit can be perimetrically expanded in plan form by use of the inflatable element to the lateral dimensions of the rear cockpit. Particularly, and referring to FIG. 2, a preferably separately inflatable element 65 is provided about the margin of the unit specifically along the front and sides of the unit. Thus, element 65 can be inflated to increase the effective lateral dimensions of the unit to the desired length and width. Inflatable element 65 also assists in maintaining the unit against movement relative to the automobile in the event of a sudden stop or the like as the inflatable element, in effect, wedges the unit into the proper position within the automobile cockpit. While device 10 is preferably manufactured in a standard size for all the various makes and models of automobiles of conventional size wherein the basic unit 10 without inflatable element 65 is per se specifically compatible with a smaller standard size automobile with the inflatable element adapting the basic unit to the larger automobiles, the basic unit as well as its inflatable element adapter 65 may be manufactured in various sizes as needed to accommodate and to be specifically useful in and compatible with per se, for example, smaller or larger than standard size passenger automobiles.

As a further embodiment of the invention hereof, there is provided, one or more, preferably a pair of superposed elongated tubular members 64 and 66 (FIG. 4) secured one to the other and preferably releasably secured along the edge of member 65. Tubular members 64 and 66 are preferably fixedly secured one to the other and may also be releasably secured or permanently secured about the edges of device 10 inset from tubular element 65. When fixedly secured, tubes 64 and 66 comprise a separately independently inflatable barrier B about the surface 16, tubes 64 and 66 having their own air valve. It will be appreciated that when the tubes 64 and 66 forming barrier B are permanently secured directly to device 10, tubular members 64 and 66 can be disposed in open communication with tubular members 32 of device 10 whereby the entire structure could be inflatable from valve 28. Likewise, when tubes 64 and 66 are secured to tube 65 with the latter permanently secured to device 10 the entire structure could be inflatable from valve 28. Also, a pair of members 64 and 66 are preferred although a single inflatable tubular member could also be employed or alternatively, any number of separately inflatable members similar to members 64 and 66 can be superposed and releasably secured to one another to provide a barrier B of selected height as desired. As best illustrated in FIG. 4, the inflatable adapter 65 is secured along the front and side edges of portion 16 and projects partially outwardly and upwardly of portion 16 with tubular members 64 and 66 being disposed above member 65. With the foregoing configuration, tubular members 64, 65 and 66 in conjunction with rear seat back 26 form an enclosure about the upper surface of portion 16.

It is also a feature of the present invention that barrier B extends in height sufficiently above portion 16 as to lie between the area enclosed thereby and interior protuberances on the sides of the automobiles, for example, the window and door handles 70 and 72 respectively in FIG. 4 as well as the rigid part of front seat back 24. Accordingly, a child within the enclosure and thrown toward the front or to either side of the automobile will impact against barrier B which provides a cushioning effect rather than against the protuberances or other rigid parts of the automobile which might cause serious injury.

Figure 9:
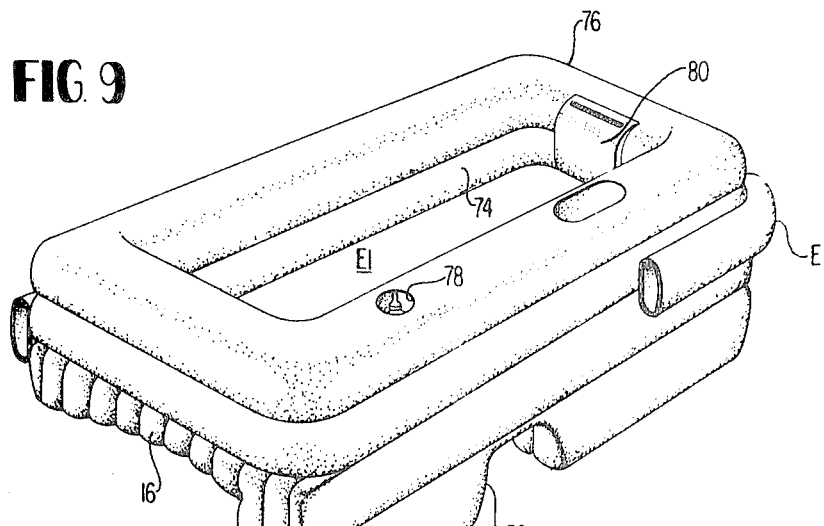
FIG. 9 is a perspective view illustrating the basic inflatable unit with a tubular barrier forming an enclosure.

In the form hereof illustrated in FIGS. 2 and 4, inflatable tubular adapter 65 extends along the front and sides of unit 10 with the rear seat back closing the fourth side. As illustrated in FIG. 9, a pair of superposed tubular members 74 and 76 are permanently secured to the edges of portion 16 to form a full enclosure E1 with inflatable adapter 65 extending about portion 16 along its front and sides. Enclosure E1 forms a playpen or sleeping area for a child with tubular members 74 and 76 forming a protective barrier or cushion fully surrounding the child. It will be appreciated that suitable recesses can be formed in the tubular members to provide pockets, for example, the pocket 78 for holding baby implements such as bottles, toys and the like. There may also be formed a zippered pocket 80 on the inside of tubular members 74 and 76 as seen in FIG. 9A.

Figure 10:
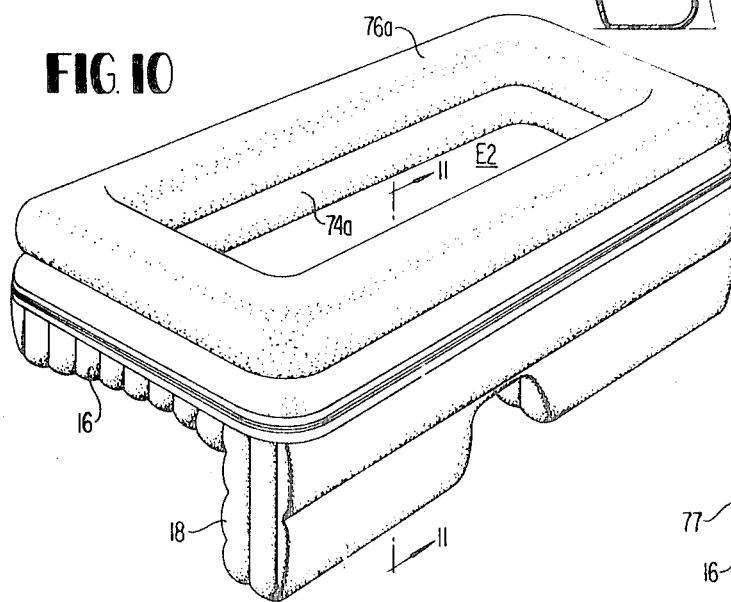
FIG. 10 is a perspective view similar to FIG. 9 illustrating the basic unit with a detachable tubular barrier.
Figure 11:
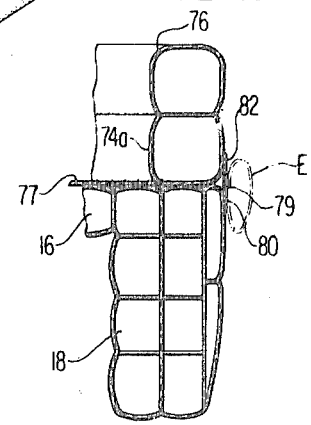
FIG. 11 is a fragmentary cross-sectional view thereof taken about on line 11—11 in FIG. 10.

In FIG. 10, a similar pair of tubular members 74a and 76a are provided to form a complete enclosure E2. In FIG. 10, tubular member 74a is releasably secured along the edges of 16. For example, as illustrated in FIG. 11, this connection could comprise a zipper connection 79 between a pair of strips 80 and 82 of material which extend about the edges of portions 16 and the outer edge of lower tubular member 74a. Other types of securing means could be utilized as desired, for example, Velcro strips. Also a floor 77 may also be provided for the enclosure E2 and extends inwardly from the lower edge of member 74a.

Figure 12:
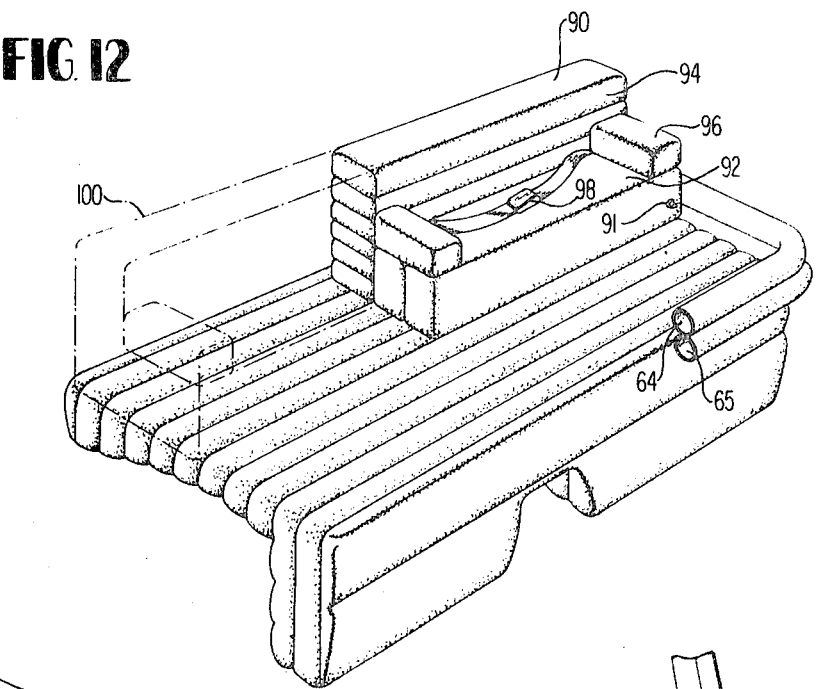
FIG. 12 is a perspective view of still another form of the invention hereof illustrating a childs car seat as employed with the basic unit hereof.

A still further form of the present invention is illustrated in FIG. 12. In this form, the basic unit is provided with one or more inflatable seats 90 releasably secured to unit 10 along the lower edges of seats 90 by zippers, buckles, straps, or the like. The seat includes a plurality of tubular, inflatable members constructed similarly as previously described and forming a seat 92 and a back 94. Particularly, the inflatable seat includes a plurality of horizontally extending tubes preferably in communication with one another, the seat 90 being separately inflatable from valve 91. An arm rest 96 on either side of seat 90 may also be provided as desired. Restraining straps 98 are also suitably secured to seat 90. Where only one seat is provided, the remaining area of portion 16 provides a flat support or play surface which is fully enclosed and protected by barrier B. Where two children are transported in the rear cockpit, a second seat 100 of like configuration can be releasably secured to portion 16 similarly as the first seat and in side by side relation thereto or a bench type seat constituting a widened version of seat 90 can be provided. Also, if desired, seat 90 can be secured directly to the automobile seat without utilizing the basic unit 10 to provide a car seat.

Figure 13:
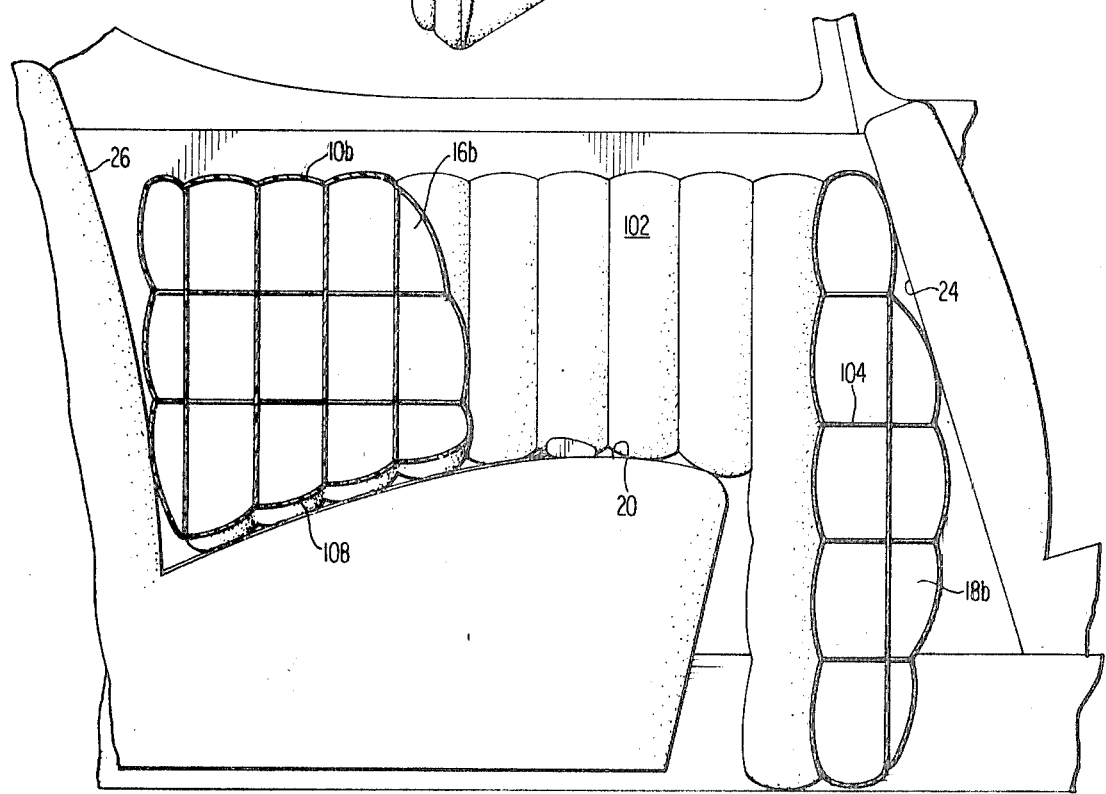
FIG. 13 is a vertical cross-sectional view of a still further form of the present invention.

Referring to FIG. 13, there is illustrated a further form of the present invention wherein the basic unit obtains the same general configuration as previously described. In this form, however, unit 10b is formed to a height sufficient to extend between the upper face of rear seat 20 and adjacent the lower window ledge or the top portion of front seat back 24. There is also provided a central opening 102 through portion 16b and a rear part of depending portion 18a whereby the front face of opening 102 formed by the rear central part of portion 18 is spaced from the front edge of rear seat 20. In this fashion, an individual can sit on rear seat 20 with his legs disposed between rear seat 20 and the reduced width part 104 of depending portion 18a. The individual is thus fully enclosed on all sides by the inflatable unit and protected from impact against the side protuberances or the front seat back 24. A seat belt can be provided through a pair of slots 108 formed in the inflated portion 16b or alternatively can overlie the seat below the lower face of portion 16b. Thus, the child is fully surrounded by the inflatable unit 16 and comfortably restrained within the opening 102.

While the foregoing description has been provided with reference to the rear cockpit of an automobile, it will be appreciated that the basic inflatable unit hereof may also be utilized in the passenger side of the front cockpit of the automobile as noted previously. The unit can be formed to a width of about one-half the interior dimensions of the automobile (the same basic cross-sectional configuration seen in FIG. 2 being utilized). A smaller inflatable element would be employed to form an enclosure similarly as in the embodiments hereof illustrated in FIG. 1, 9 and 10. Obviously, a single carseat of the type illustrated in FIG. 12 could be employed and a central opening could be provided in another form similarly as the opening 102 is provided in FIG. 13.

While the portion 16 of unit 10 is preferably provided with the cross-sectional shape illustrated in FIG. 2 whereby its underface conforms to the contour of seat 20, it will be appreciated that the contour of seat 20 in certain automobiles will be somewhat differently shaped than the contour illustrated. For example, the seat may decline more or less toward the seat back 26 than illustrated. To accommodate various declinations and seat contours, the basic unit 10 is provided with an upper portion 16C which has generally rectangular cross section, when inflated, as seen in FIG. 8. In other words, the tubular members 32C are constant in cross-sectional area throughout their full lengths between opposite sides of the automobile while depending portion 18C is identical to the depending portion 18 described with respect to FIG. 2. To accommodate various seat contours there is provided a separately inflatable member 120 preferably formed of a plurality of elongated tubular sections 122 which, when member 120 is inflated, extend in a direction parallel to members 32C of portion 16C. Tubular members 122 are formed to provide a first member of small cross-sectional area with succeeding members toward the rear seat back 24 having progressively increasing cross-sectional areas. Further, member 120 is formed such that its upper surface is generally horizontal and its underface contoured. Member 120 is preferably, separately inflatable from unit 10. When member 120 is disposed on the rear seat 20, it can be selectively inflatable to a greater or lesser extent such that its upper surface may lie substantially in the same horizontal plane which passes through the apex portion of seat 20. In this manner, member 120 forms the base for the rear edge portion of portion 16C when the latter is disposed in the automobile and inflated. Member 120 can be secured, either releasably as by a zipper or permanently, for example by heat sealing or stitching to member 16C as desired.

Figure 14:
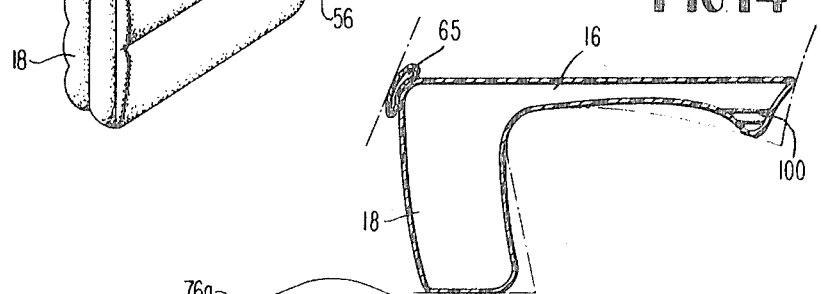
FIG. 14 is a vertical cross-sectional view of another form hereof.

As illustrated in FIG. 14 there is disclosed a basic unit having a construction similar to the construction illustrated in FIG. 4 with the tubes of the unit extending longitudinally. In this form, however, the undersurface of an intermediate section of portion 16 extends substantially horizontally and is spaced above the seat. This intermediate section of portion 16 thus bridges over the intermediate portion of the seat with support for portion 16 being provided along its rear edge by a plurality of depending longitudinally extending transversely arranged tubular units 100. The rigidity of the unit is obtained through the inflation of the longitudinal tubes in portion 16 which have the capability of supporting substantial loads.

It will thus be appreciated that the objects of the present invention are fully accomplished in that there has been provided a basic inflatable unit which occupies substantially the full volume of the rear cockpit from a horizontal plane just above the rear seat downwardly to the floor of the automobile to provide a horizontal support surface for loads, children, etc., extending fully between the front and rear seat backs. The basic unit is adaptable for use in a wide variety of makes and models of standard size automobiles and can be readily, easily and simply installed and removed from the automobile as desired. The basic unit, moreover, can be folded to a compact size for ready storage in a small space. As will be appreciated from the foregoing description, the basic unit can also be modified to provide a rear cockpit playpen, crib, car seat or generally a protective enclosure for children.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for use in a cockpit of an automobile comprising a substantially rectangular inflatable first portion configured to overlie a portion of the seat of an automobile when inflated; a second inflatable portion extending from said first portion along an edge thereof and projecting, when inflated, substantially normal to said first portion for disposition in the well of an automobile; an elongated inflatable element, means for securing said inflatable element along at least one side and an adjacent edge of said device with said element lying in a generally horizontal plane, said element, when inflated, projecting laterally outwardly of said one side and said adjacent edge to effectively longitudinally and laterally perimetrically expand said device whereby the plan area of said device is substantially conformable to the plan area of the automobile cockpit, said device being configured to lie, when inflated, wholly within the vertical confines of the cockpit of the automobile and constrained from substantial movement in a longitudinal or lateral direction relative to the automobile.

2. The device according to claim 1 wherein said first and second portions lie in communication one with the other, said element being separately inflatable, and means for releasably securing said element to said device.

3. The device according to claim 1 wherein said first portion has a pair of openings for receiving safety belts carried by the automobile.

4. The device according to claim 1 wherein the upper face of said first portion lies substantially in a horizontal plane, when inflated, and disposed in the automobile; said first portion having a lower, generally arcuate face portion conformable to the rearwardly and downwardly declining surface of the seat of the automobile.

5. The device according to claim 1 including an inflatable generally L-shaped member forming a seat, said latter member being secured to the upper surface of said first portion.

6. The device according to claim 5 wherein said member is releasably secured to said first portion, said member extending laterally a distance at least substantially one-half the width of the automobile cockpit.

7. The device according to claim 1 wherein the device is configured to lie, when inflated, wholly within the vertical confines of the rear cockpit of the automobile between the front and rear seat backs and between the opposite sides of the automobile, means for securing said element along the opposite sides and front edge of said device, said element, when inflated, projecting laterally outwardly of and partially enclosing the area defined by the upper surface of said device to effectively perimetrically expand said device in lateral and longitudinal directions for substantial conformation with the plan area of the automobile.

8. The device according to claim 7 including a second inflatable element, means for securing said second inflatable element along the opposite sides and front edge of said device such that said second element is disposed inwardly of said first mentioned element, said second element, when inflated, projecting above and perimetrically enclosing the area defined by the upper surface of said device on the opposite sides and front edge thereof, said second element being adapted to form a protective cushion between the opposite sides and front seats of the automobile and the area enclosed thereby.

9. A device according to claim 1 wherein the underface of said first portion lies in a substantially horizontal plane, an inflatable member for disposition, when inflated, below the underface of said first portion on the seat, said member having a cross-sectional configuration to substantially fill, when inflated, the space enclosed by the underface of said first portion, the upper face of the seat, and the seat back.

10. A device according to claim 1 wherein a part of said first portion extends generally horizontal and is adapted to lie in spaced relation above an intermediate portion of the seat, a part of said first portion along an edge thereof remote from said second portion projecting in a downward direction for engagement with a rear portion of the seat whereby said first mentioned part is supportable when it bridges over the intermediate portion of the seat.

11. A device for use in a cockpit of an automobile comprising a substantially rectangular inflatable first portion configured to overlie a portion of the seat of an automobile when inflated; a second inflatable portion extending from said first portion along an edge thereof and projecting substantially normal to said first portion when said device is inflated for disposition in the well of an automobile; said device being configured to lie, when inflated, wholly within the vertical confines of the rear cockpit of the automobile between the front and rear seat backs and between the opposite sides of the automobile and constrained from substantial movement in a forward or rearward direction relative to the automobile, each of said portions including a plurality of restraining members extending interiorly between the walls thereof for maintaining said device in said configuration, said first and second portions lying in open communication one with the other, means carried by one of said first and second portions for inflating said device, said second portion including an edge remote from said first portion and having a recess intermediate its ends for substantially conforming about the tunnel in the floor of the automobile.

12. The device according to claim 11 including an elongated inflatable element, means for securing said inflatable element along at least one side and an adjacent edge of said device with said element lying in a generally horizontal plane, said element, when inflated, projecting laterally outwardly of said one side and said adjacent edge to effectively perimetrically expand said device whereby the plan area of said device is substantially conformable to the plan area of the automobile cockpit.

13. The device according to claim 11 including an elongated inflatable element, means for securing said inflatable element along at least three adjacent side and end edges of said device, said element, when inflated, projecting above and perimetrically enclosing the area defined by the upper surface of said device, on at least three sides thereof; said element being adapted to form a protective cushion between the interior walls of the automobile facing the adjacent side and end edges and the area enclosed.

14. The device according to claim 11 wherein said first portion has a pair of openings for receiving safety belts carried by the automobile, the upper face of said first portion lying substantially in a horizontal plane, when inflated, and disposed in the automobile; said first portion having a lower generally arcuate face portion conformable to the rearwardly and downwardly declining surface of the seat of the automobile.

15. A device according to claim 11 wherein a part of said first portion extends generally horizontal and is adapted to lie in spaced relation above an intermediate portion of the seat, a part of said first portion along an edge thereof remote from said second portion projecting in a downward direction for engagement with a rear portion of the seat whereby said first mentioned part is supportable when it bridges over the intermediate portion of the seat.

16. A device according to claim 11 wherein said restraining members comprise inflatable tubular elements disposed in side-by-side generally parallel relation one with the other and extending between opposite edges of the respective portions, each of said tubular elements lying in communication with each of the other of said tubular elements.

17. A device for use in a cockpit of an automobile comprising a substantially rectangular inflatable first portion and forming a protective enclosure for an occupant in the automobile cockpit configured to overlie a portion of the seat of an automobile when inflated; a second inflatable portion extending from said first portion along an edge thereof and projecting, when inflated, substantially normal to said first portion for disposition in the well of an automobile; said device being configured to lie, when inflated, wholly within the vertical confines of the rear cockpit of the automobile between the front and rear seat backs and between the opposite sides of the automobile and constrained from substantial movement in a forward or rearward direction relative to the automobile, said first portion including a central opening with the surrounding wall portions thereof defining a protective enclosure for the occupant disposed within the opening.

18. The device according to claim 17 wherein said opening extends through said first portion, said second portion being, in part, spaced from the forward edge of the seat with the spaced part defining a portion of the wall defining said protective enclosure.

* * * * *

UNITED STATES PATENT OFFICE
CERTIFICATE OF CORRECTION

Patent No. 3,648,306             Dated March 14, 1972

Inventor(s) Seymour Auerbach

It is certified that error appears in the above-identified patent and that said Letters Patent are hereby corrected as shown below:

In Column 2, line 23, "effect, element" should read --inflatable element--.

In Column 5, line 29, "be also be" should read --also be--.

Signed and sealed this 26th day of September 1972.

(SEAL)
Attest:

EDWARD M. FLETCHER, JR.
Attesting Officer

ROBERT GOTTSCHALK
Commissioner of Patents